United States Patent [19]

Kyri et al.

[11] 4,200,622

[45] Apr. 29, 1980

[54] PURIFICATION OF AMMONIUM FLUORIDE SOLUTIONS

[75] Inventors: Hans Kyri; Hans-Dietrich Lauss; Siegfried Schneider, all of Cologne, Fed. Rep. of Germany

[73] Assignee: Bayer Aktiengesellschaft, Leverkusen, Fed. Rep. of Germany

[21] Appl. No.: 960,329

[22] Filed: Nov. 13, 1978

[30] Foreign Application Priority Data

Nov. 15, 1977 [DE] Fed. Rep. of Germany ....... 2750943

[51] Int. Cl.$^2$ .............................................. C01C 1/16
[52] U.S. Cl. ................... 423/471; 423/143; 423/339; 423/465
[58] Field of Search ............... 423/143, 470, 471, 465, 423/339

[56] References Cited

U.S. PATENT DOCUMENTS

| | | | |
|---|---|---|---|
| 2,981,597 | 4/1961 | Tarbutton | 423/465 |
| 3,201,193 | 8/1965 | Baumann | 423/471 |
| 3,563,699 | 2/1971 | Cuneo | 423/465 |
| 3,755,546 | 8/1973 | Lichtstein | 423/470 |
| 4,057,614 | 11/1977 | Ono | 423/339 |

FOREIGN PATENT DOCUMENTS 214409 4/1961 Austria ..................................... 423/471

OTHER PUBLICATIONS

Smith, *The Sequestration of Metals,* Chapman & Hall Ltd., London (1959) pp. 78.

*Primary Examiner*—Brian E. Hearn
*Attorney, Agent, or Firm*—Sprung, Felfe, Horn, Lynch & Kramer

[57] ABSTRACT

In the purification of an ammonium fluoride solution containing silicic acid by adding iron (III) ions and precipitating the iron (III) ions at a pH above 8.5 and a concentration of free ammonia in the solution of more than about 1% by weight, the silicic acid being carried with the iron (III) ion precipitate, the improvement which comprises adding the iron (III) ions to the ammonium fluoride solution at a temperature below about 30° C. and, before removal of the precipitate, to the solution a salt of at least one of the alkali metals, alkaline earth metals, zinc, aluminum and lead in such quantity that the solution becomes saturated with such salt.

5 Claims, No Drawings

PURIFICATION OF AMMONIUM FLUORIDE SOLUTIONS

The present invention relates to a process for the purification of commercial ammonium fluoride solutions by removal of silicic acid and iron salts.

Commercial ammonium fluoride solutions are obtained from various chemical processes. The commercial treatment of aqueous hexafluorosilicic acid solution with ammonia, for example, gives rise to insoluble silicic acid and an approximately 20% ammonium fluoride solution from which cryolite and ammonia can be obtained after removal of the silicic acid, for example with a sodium aluminate solution. Ammonium bifluoride is also produced commercially from such ammonium fluoride solutions.

Some of these end products are required to have a very high degree of purity, and therefore this also applies to ammonium fluoride itself, particularly with regard to its content of phosphates, silicic acid and iron compounds. Ions of iron phosphate, for example from the raw materials used for the manufacture of fertilizers, are carried into the fluorosilicic acid and thereby contaminate the ammonium fluoride solution in the process of working up of the fluorosilicic acid. The dissolved silicic acid content is derived from that proportion which is not completely precipitated when hexafluorosilicic acid is decomposed with ammonia. A residue of up to 1 g or more of $SiO_2$ per liter is always left in the ammonium fluoride solution even under very careful operating conditions.

When such a solution is subsequently worked up, for example to produce cryolite by reaction with a sodium aluminate solution, a further proportion of $SiO_2$ enters the end product from the aluminate solution and the $Fe_2O_3$ from both solutions is precipitated virtually quantitatively with the cryolite too.

It is therefore customary to mix the cryolite which has been produced from commercial ammonium fluoride solutions with cryolite which has been prepared from chemically pure hydrofluoric acid so that the cryolite as a whole will be sufficiently pure. However, such a process is uneconomical and can only be carried out to a limited extent since it is dependent on the production of a pure hydrofluoric acid.

Freshly precipitated ferric hydroxide binds both phosphate ions and silicic acid by adsorption and precipitates them out with itself from a solution. Such precipitations or carrier effects are known and are commonly used in analytical chemistry.

Since, ferric hydroxide dissolves in hot ammonium fluoride solution, however, the iron concentration increases to an intolerable level even though the solution is freed from $SiO_2$ by the carrier effect. Although it is possible by this method to prepare a solution of cryolite containing less than 0.3% by weight of $SiO_2$, the cryolite contains considerably more $Fe_2O_3$ than is acceptable for the usual commercial specifications.

It has now surprisingly been found that not only the $SiO_2$ content but also the amount of dissolved iron (III) compounds in an ammonium fluoride solution can be drastically reduced if iron (III) hydroxide is precipitated from a solution of ammonium fluoride which is saturated with ions of one or more of the alkali metals, the alkaline earth metals, zinc, aluminum or lead. The same result is also achieved if the iron (III) hydroxide is precipitated first and the solution is then saturated with the aforesaid ions before the iron hydroxide precipitate is removed. The concentration of iron in the solution is reliably reduced to below about 0.01% by weight by this procedure, and a cryolite prepared from such a solution, for example, contains only about 0.05% by weight of $Fe_2O_3$.

The present invention therefore provides a process for the purification of commercial ammonium fluoride solution by removal silicic acid and iron ions by precipitating the silicic acid with the iron (III) salts by the carrier effect at a pH above about 8.5 from a solution containing more than about 1% by weight of free ammonia, which process is characterized in that the iron (III) salt is added to the ammonium fluoride solution at a temperature below about 30° C. and one or more dissolved salts of the ions of the alkali metals, the alkaline earth metals, zinc, aluminum and/or lead are added in such quantities before, during or after precipitation but before removal of the precipitate by filtration that the solution is saturated with at least one of these ions.

The process of the present invention therefore furnishes a simple means for separating silicic acid and iron ions by adding ions of one or more of the alkali metals, the alkaline earth metals, zinc, aluminum or lead, preferably one or more of the ions of the elements lithium, sodium, potassium, magnesium, calcium, barium or lead to the impure solution of ammonium fluoride which is to be treated until said solution is saturated. The aforementioned ions are added in the form of their soluble salts but these salts must not be capable of being incorporated into the crystal structure, for example, of cryolite. It is therefore advisable not to use dissolved sulphates of these cations or of trivalent iron because sulphate ions, in contrast for example to the chloride and/or nitrate ions which are preferred embodiments according to the invention, are incorporated into the cryolite lattice. Sulphate ions are therefore regarded as undesirable impurities for the purpose of this invention. The salt solution used is preferably circulated so that problems of effluent do not arise.

The iron (III) salt may be added in solid form, as a solution or in the form of complex salts. Any iron (III) salts which form an iron hydroxide precipitate in alkaline solution may be used.

The cations mentioned above, which in the process of the present invention also lower the iron content of an ammonium fluoride solution, have no effect on the composition of the cryolite since they precipitate from the ammonium fluoride solution as fluorides, apart from slight traces. The quantity of cations therefore has hardly any effect on the residual quantity of iron ions so long as the solubility of the particular fluorides has been substantially exceeded. When the sodium ions for example, are added for the precipitation of iron hydroxide, they reach a concentration of about 1 to 2 g of sodium per liter in the purified ammonium fluoride solution. However, when the purified solution is reacted to produce cryolite, these sodium ions form a constituent of the end product.

The process of the present invention enhances the action of iron (III) hydroxide as a precipitating agent for silicic acid. The addition of magnesium chloride, for example, can reduce the residual $SiO_2$ content to about 0.02% by weight while the addition of magnesium chloride and sodium hydroxide together can reduce the $SiO_2$ content even to below about 0.013% by weight.

It has been found that the lower the temperature of the solution at the time of precipitation, the lower is the residual amount of silicic acid left in the solution which has been purified according to the process of the present invention. The temperature should therefore not exceed about 30° C. and should preferably be below about 20° C.

Both the absorption of silicic acid on iron (III) hydroxide, and the precipitation of the dissolved iron compounds by the addition of other cations, are reactions which reach their equilibrium state only after some time. The contact between the solution and the precipitate must therefore also be maintained for some time, i.e. several minutes. The solution is therefore preferably lightly stirred, and the contact maintained for at least about 30 minutes.

An ammonium fluoride solution which has been purified by the process according to the present invention may very suitably be worked up into other commercially utilizable fluorides having a high degree of purity on account of its exceptionally low contents of silicic acids and iron compounds.

The present invention will be further illustrated in the following examples.

EXAMPLE 1 (Comparison example)

An $NH_4F$ solution having a density of 1.06 g/cm$^3$ and containing 20% by weight of $NH_4F$, 3% by weight of free ammonia and 0.061% by weight of $SiO_2$ as impurity was obtained from the decomposition of an $H_2SiF_6$ solution with ammonia followed by cooling and removal of the silicic acid by filtration. The solution obtained had a pH of 8.7.

To 1,000 ml of this solution was added an equivalent quantity of a solution of $Na_3Al(OH)_6$ with stirring at 80° C. The cryolite which precipitated was washed and calcined at 550° C. It contained 0.40% by weight of $SiO_2$ and 0.04% by weight of $Fe_2O_3$ as impurities. Due to its high $SiO_2$ content, this cryolite must be mixed with a large proportion of pure cryolite if it is to be used for the manufacture of aluminum.

EXAMPLE 2

1,000 ml of an $NH_4F$ solution (prepared as in Example 1) was cooled to 20° C., and a solution of 2.4 g of NaOH in 10 ml of water was added. The solution had a pH of 9.0. A solution of 3.5 g of $FeCl_3.6 H_2O$ in 15 ml of water was then added dropwise with stirring over a period of about 3 minutes.

The resulting precipitate was kept in suspension in the solution for 45 minutes by light stirring and was then filtered off.

1020 ml of the filtrate, without the wash water of the residue, still contained 198 g of the original quantity of 200 g $NH_4F$. In addition, it contained 0.022% by weight of $SiO_2$ and 0.0012% by weight of $Fe_2O_3$ in solution.

When this solution was reacted with the equivalent quantity of $Na_3Al(OH)_6$, cryolite precipitated at 80° C. and this was filtered off and calcined at 550° C. This cryolite contained 0.22% by weight of $SiO_2$ and 0.04% by weight of $Fe_2O_3$.

EXAMPLE 3.

1,000 ml of an $NH_4F$ solution (prepared as in Example 1) was cooled to 20° C. and a solution of 3.5 g of $FeCl_3.6 H_2O$ in 15 ml of water was added with stirring. The resulting precipitate was kept in suspension for about 45 minutes by light stirring. A solution of 2.0 g of NaOH in 20 ml of water was then added and the reaction mixture was filtered after a further 15 minutes.

The filtrate contained 0.025% by weight of $SiO_2$ and 0.001% by weight of $Fe_2O_3$ in solution.

EXAMPLE 4 (comparison example)

The procedure was the same as described in Example 3 except that there was no addition of NaOH solution.

The resulting filtrate contained 0.035% by weight of $SiO_2$ and 0.025% by weight of $Fe_2O_3$. A cryolite prepared from it (by a method analogous to that described in Examples 1 and 2) contained 0.27% by weight of $SiO_2$ and 0.15% by weight of $Fe_2O_3$. It has a distinct brown discoloration due to the presence of $Fe_2O_3$ and is unusable for aluminum-melt electrolysis because of its $Fe_2O_3$ content.

EXAMPLES 5 to 11

The procedures were exactly the same as in Example 3 but instead of 2 g of NaOH, a solution of the salts set forth in the following table was added to the $NH_4F$ solution. The table shows the quantities of $Fe_2O_3$ and silicic acid contained in the cryolite. The quantities of salt added were in each case dissolved in 50 ml of water.

Table

To 1,000 ml of a 20% $NH_4F$ solution were added 3.5 g of $FeCl_3.6 H_2O$ dissolved in 15 ml of water, and after 45 minutes the following salts dissolved in 50 ml of water were stirred in:

| Example Number | Salt and quantity | Analysis of filtrate percent by weight $SiO_2$ | percent by weight $Fe_2O_3$ | percent by weight other constituents |
|---|---|---|---|---|
| 5 | 4g NaCl | 0.031 | 0.001 | 0.09 $Na_2O$ |
| 6 | 4g KOH | 0.033 | 0.013 | 0.48 $K_2O$ |
| 7 | 4g $CaCl_2$ | 0.023 | 0.005 | 0.0001 CaO |
| 8 | 4g $MgCl_2 . 6 H_2O$ | 0.02 | 0.001 | 0.0001 MgO |
| 9 | 4g $BaCl_2 . 2 H_2O$ | 0.02 | 0.003 | 0.0017 BaO |
| 10 | 4g $Pb(NO_3)_2$ | 0.02 | 0.01 | 0.015 PbO |
| 11 | 4g $MgCl_2 . 6 H_2O$ + 2g NaOH | 0.012 | 0.001 | 0.16 $Na_2O$ |

EXAMPLE 12

The procedure was the same as described in Example 4 but precipitation of the iron (III) hydroxide was carried out with the $NH_4F$ solution at a temperature of 30° C.

The purified filtrate still contained 0.04% by weight of $SiO_2$ and 0.03% by weight of dissolved iron salts calculated as $Fe_2O_3$.

A cryolite prepared from it contained only 0.3% by weight of $SiO_2$ but more than 0.2% by weight of $Fe_2O_3$.

EXAMPLE 13

The procedure was the same as described in Example 12 except that a solution of 2 g of NaOH in 10 ml of water was stirred into the solution (which was at 30° C.) after addition of the iron (III) chloride solution.

The purified filtrate contained only 0.04% by weight of $SiO_2$ and 0.001% by weight of dissolved iron salts, calculated as $Fe_2O_3$.

It will be appreciated that the instant specification and examples are set forth by way of illustration and not limitation, and that various modifications and changes may be made without departing from the spirit and scope of the present invention.

What we claim is:

1. A process for the purification of a commercial ammonium fluoride solution by removal of silicic acid and iron ions therefrom which comprises the steps of:
    (i) adding, at a temperature of below 30° C., an iron (III) salt to said commercial ammonium fluoride solution having a concentration of free ammonia in solution of greater than 1% by weight and a pH of more than 8.5;
    (ii) adding one or more of the dissolved salts of the ions of the alkali metals, alkali earth metals, zinc, aluminum or lead in such quantities that the solution becomes saturated with at least one of said ions; and
    (iii) removing the precipitated iron (III) salts and the silicic acid carried therewith.

2. A process as claimed in claim 1 wherein the commercial ammonium fluoride solution is saturated with at least two of the dissolved salts of lithium, sodium, potassium, magnesium, calcium, barium, or lead in step (ii).

3. A process as claimed in claim 1 or claim 2 wherein the iron (III) salt is added in solid form.

4. A process as claimed in claim 1 or claim 2 wherein the iron (III) salt is added in the form of a solution.

5. A process as claimed in any of claims 1 or 2 wherein the or each of the dissolved salts added in step (ii) is a chloride, a nitrate or a mixture thereof.

* * * * *